United States Patent
Hirose

(10) Patent No.: US 12,387,728 B2
(45) Date of Patent: Aug. 12, 2025

(54) UTTERANCE SECTION DETECTION DEVICE, UTTERANCE SECTION DETECTION METHOD, AND STORAGE MEDIUM

(71) Applicant: Panasonic Intellectual Property Management Co., Ltd., Osaka (JP)

(72) Inventor: Yoshifumi Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 562 days.

(21) Appl. No.: 17/539,499

(22) Filed: Dec. 1, 2021

(65) Prior Publication Data

US 2022/0093102 A1    Mar. 24, 2022

Related U.S. Application Data

(63) Continuation of application No. PCT/JP2020/022334, filed on Jun. 5, 2020.

(30) Foreign Application Priority Data

Jun. 11, 2019  (JP) ................................ 2019-108910

(51) Int. Cl.
  *G10L 15/25*  (2013.01)
  *G10L 15/22*  (2006.01)
  (Continued)

(52) U.S. Cl.
  CPC .............. *G10L 15/25* (2013.01); *G10L 15/22* (2013.01); *G10L 25/75* (2013.01); *G10L 25/84* (2013.01); *H04R 3/005* (2013.01)

(58) Field of Classification Search
  CPC ......... G10L 15/25; G10L 15/22; G10L 25/75; G10L 25/84; G10L 25/78; H04R 3/005;
  (Continued)

(56) References Cited

U.S. PATENT DOCUMENTS 6,332,123 B1 * 12/2001 Kaneko ................. G06T 13/205
                                                                704/E21.02
8,831,681 B1 *  9/2014 Paiss ................... H04M 1/6041
                                                                455/575.1
(Continued)

FOREIGN PATENT DOCUMENTS

JP         6-301393     10/1994
JP      2000-338987     12/2000
(Continued)

OTHER PUBLICATIONS

English Translation of the International Preliminary Report on Patentability and Written Opinion of the International Searching Authority issued Dec. 14, 2021 in International (PCT) Application No. PCT/JP2020/022334.

(Continued)

*Primary Examiner* — Pierre Louis Desir
*Assistant Examiner* — Keisha Y. Castillo-Torres
(74) *Attorney, Agent, or Firm* — Wenderoth, Lind & Ponack, L.L.P.

(57) ABSTRACT

Provided is an utterance section detection device including: a first lip shape estimation module configured to estimate a first lip shape of an utterer, based on sound data including a voice of the utterer, a second lip shape estimation module configured to estimate a second lip shape of the utterer; based on image data in which an image of at least a face of the utterer is photographed; and an utterance section detection module configured to detect an utterance section in which the utterer is vocalizing in the sound data, based on changes in the first lip shape and changes in the second lip shape.

18 Claims, 7 Drawing Sheets

(51) Int. Cl.
*G10L 25/75* (2013.01)
*G10L 25/84* (2013.01)
*H04R 3/00* (2006.01)

(58) Field of Classification Search
CPC . H04R 29/005; H04R 29/004; G06F 2218/10; G06V 40/171
See application file for complete search history.

(56) References Cited

U.S. PATENT DOCUMENTS

| | | |
|---|---|---|
| 9,853,758 B1 * | 12/2017 | Channegowda ........ G10L 15/25 |
| 2017/0011554 A1 * | 1/2017 | Burba .................... G06T 15/20 |
| 2018/0286404 A1 * | 10/2018 | Cech ...................... G06T 7/254 |
| 2020/0137492 A1 | 4/2020 | Hirose et al. |
| 2023/0168694 A1 * | 6/2023 | Ching ................... G05D 1/101 |
| | | 701/3 |

FOREIGN PATENT DOCUMENTS

| | | |
|---|---|---|
| JP | 2008-152125 | 7/2008 |
| JP | 2013-33103 | 2/2013 |
| WO | 2019/049494 | 3/2019 |

OTHER PUBLICATIONS

International Search Report issued Jul. 28, 2020 in International (PCT) Application No. PCT/JP2020/022334.

* cited by examiner

UTTERANCE SECTION DETECTION DEVICE, UTTERANCE SECTION DETECTION METHOD, AND STORAGE MEDIUM

CROSS-REFERENCE TO RELATED APPLICATIONS

This is a continuation application of International Application No, PCT/JP2020/022334, with an international filing date of June 5, 2020, which claims priority of Japanese Patent Application No. 2019-108910 filed on Jun. 11, 2019, the content of which is incorporated herein by reference.

BACKGROUND OF THE INVENTION

1. Field of the Invention

The present disclosure relates to a device, a method, and a program for detecting an utterance section in which an utterer is vocalizing in sound data including an utterer's voice.

2. Description of the Related Art

In Japanese Patent Application Laid-open No. 2008-152125, for example, there are disclosed a device and a method for detecting a section of utterance by an utterer's voice (an utterance section) in a sound (sound data) collected with a microphone, based on changes in the utterer's lip shape that are captured in images (image data) obtained by a camera.

With the device and method described in Japanese Patent Application Laid-open No. 2008-152125, however, when the utterer is in motion, for example, walking or moving his or her head, within a photographing range of the camera, a precision at which the utterer's lip region is extracted from photographed image data of the camera is low. As a result, a precision of utterance section detection may drop due to, for example, erroneous detection of a section of the sound data in which the utterer is not vocalizing as an utterance section.

SUMMARY OF THE INVENTION

It is therefore an object of the present disclosure to detect, with high precision, an utterance section in which an utterer is vocalizing in sound data including an utterer's voice.

According to one aspect of the present disclosure, there is provided an utterance section detection device including: a first lip shape estimation module configured to estimate a first lip shape of an utterer, based on sound data including a voice of the utterer; a second lip shape estimation module configured to estimate a second lip shape of the utterer, based on image data in which an image of at least a face of the utterer is photographed; and an utterance section detection module configured to detect an utterance section in which the utterer is vocalizing in the sound data, based on changes in the first lip shape and changes in the second lip shape.

According to another aspect of the present disclosure, there is provided an utterance section detection method for detecting, in sound data including a voice of an utterer, an utterance section in which the utterer is vocalizing, the utterance section detection method including: acquiring the sound data; acquiring image data in which an image of at least a face of the utterer is photographed; estimating changes in a first lip shape of the utterer based on the sound data; estimating changes in a second lip shape of the utterer based on the image data; and detecting the utterance section in the sound data based on the changes in the first lip shape and the changes in the second lip shape.

According to still another aspect of the present disclosure, there is provided a non-transitory computer-readable storage medium having stored thereon instructions executable by one or more processor to cause the one or more processor to execute functions including: estimating a first lip shape of an utterer based on sound data including a voice of the utterer; estimating a second lip shape of the utterer based on image data in which an image of at least a face of the utterer is photographed; and detecting the utterance section in which the utterer is vocalizing in the sound data, based on changes in the first lip shape and changes in the second lip shape.

According to a different aspect of the present disclosure, there is provided an utterance section detection device including: a first lip shape estimation module configured to calculate a first opening degree of an utterer, based on sound data including a voice of the utterer; a second lip shape estimation module configured to calculate a second opening degree of the utterer, based on image data in which an image of at least a face of the utterer is photographed; and an utterance section detection module configured to detect an utterance section in which the utterer is vocalizing in the sound data, based on changes in the first opening degree and changes in the second opening degree.

According to another different aspect of the present disclosure, there is provided an utterance section detection device including: a first lip shape estimation module configured to calculate a first lip motion amount of an utterer, based on sound data including a voice of the utterer; a second lip shape estimation module configured to calculate a second lip motion amount of the utterer, based on image data in which an image of at least a face of the utterer is photographed; and an utterance section detection module configured to detect an utterance section in which the utterer is vocalizing in the sound data, based on changes in the first lip motion amount and changes in the second lip motion amount.

According to the at least one aspect of the present disclosure, the utterance section in which the utterer is vocalizing can be detected with high precision in the sound data including the utterer's voice.

DESCRIPTION OF THE EMBODIMENTS

At least one embodiment of the present disclosure is described below in detail with reference to the drawings as required. However, an overly detailed description may be omitted. For instance, a detailed description of an already well known matter and overlapping descriptions of configurations that are substantially the same may be omitted. This is to prevent the following description from being overly redundant, and facilitate understanding of a person skilled in the art.

The inventor provides the accompanying drawings and the following description in order for the skilled in the art to fully understand the present disclosure, and does not intend those to limit a subject matter described in the appended claims.

An utterance section detection device according to the at least one embodiment of the present disclosure is described below with reference to the drawings. The term "utterance section detection" is sometimes called "a Voice Activity Detection (VAD)".

Figure 1:
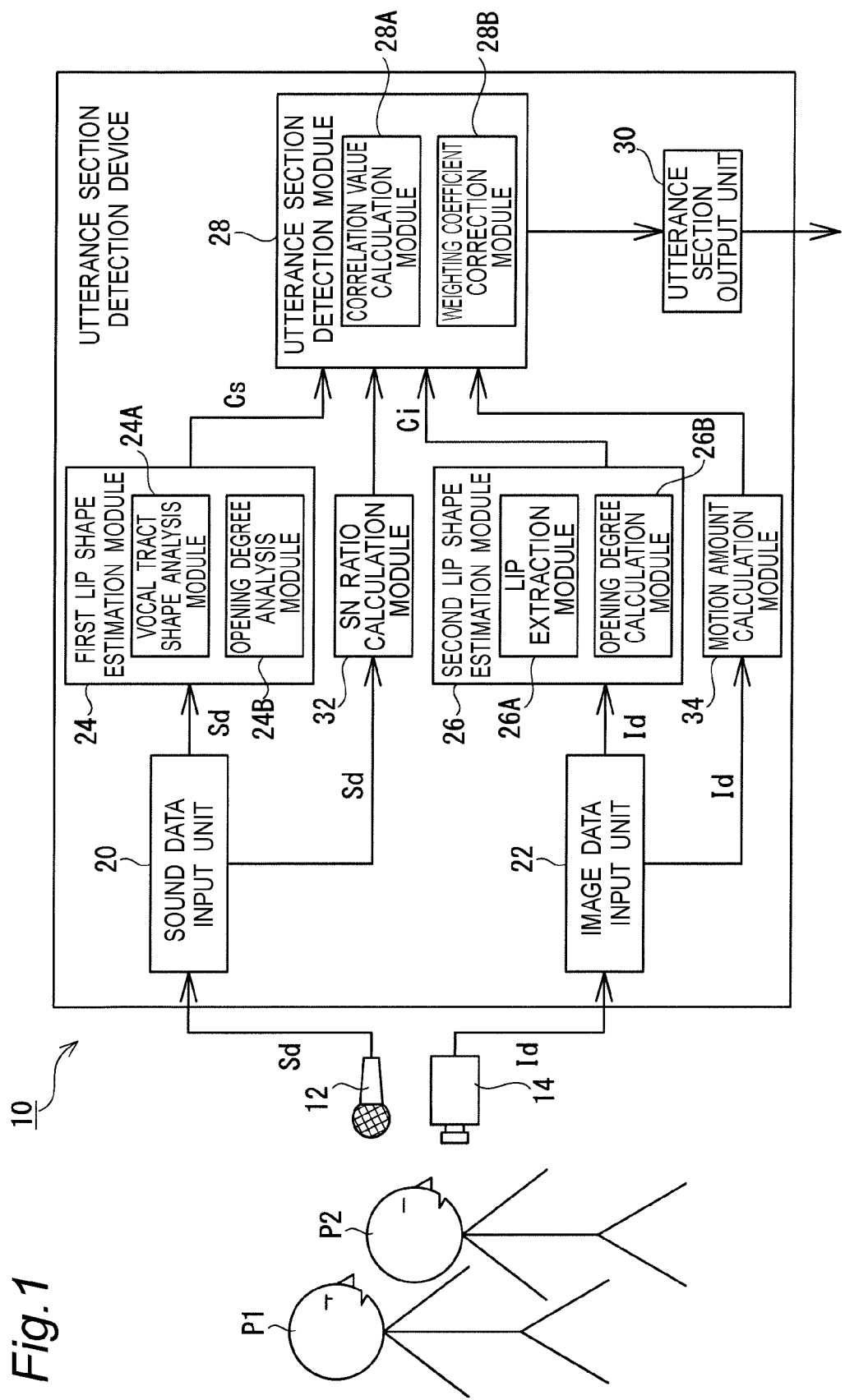
FIG. 1 is a diagram for schematically illustrating a configuration of an utterance section detection device according to at least one embodiment of the present disclosure.

FIG. 1 is a schematic illustration of a configuration of the utterance section detection device according to the at least one embodiment of the present disclosure.

An utterance section detection device 10 according to the at least one embodiment and illustrated in FIG. 1 is configured to detect, for each of a plurality of utterers, here, P1 and P2, an utterance section as a section in which the utterer is vocalizing, in sound data Sd, which is acquired by a microphone device 12 and which includes voices of the utterers P1 and P2. For that reason, the utterance section detection device 10 is configured to use image data Id, which is acquired by a camera device 14 and which is data of photographed images of at least faces of the plurality of utterers P1 and P2.

As illustrated in FIG. 1, the microphone device 12 and the camera device 14 are connected to the utterance section detection device 10 according to the at least one embodiment. The utterance section detection device 10 includes a sound data input unit 20 to which the sound data Sd from the microphone device 12 is to be input, and an image data input unit 22 to which the image data Id from the camera device 14 is to be input.

The utterance section detection device 10 also includes a first lip shape estimation module 24 configured to estimate a lip shape (first lip shape) of each of the utterers P1 and P2, based on the sound data Sd input to the sound data input unit 20, and a second lip shape estimation module 26 configured to estimate a lip shape (second lip shape) of each of the utterers P1 and P2, based on the image data Id input to the image data input unit 22. The utterance section detection device 10 further includes an utterance section detection module 28 configured to detect an utterance section in the sound data Sd, based on changes in lip shape estimated by the first lip shape estimation module 24 and on changes in lip shape estimated by the second lip shape estimation module 26.

In the at least one embodiment, the utterance section detection device 10 further includes an utterance section output unit 30 configured to output the detected utterance section to a user, an SN ratio calculation module 32 configured to calculate an SN ratio of the sound data Sd, and a motion amount calculation module 34 configured to calculate, for each of the utterers P1 and P2, a motion amount of the utter, based on the image data Id.

The thus configured utterance section detection device 10 is implemented by, for example, a personal computer including at least one processor that is a CPU or the like, and a storage device or a non-transitory computer-readable storage medium that is a hard disk drive or the like. In this case, the utterance section detection device 10 includes an external connection terminal for connecting to the microphone device and the camera device 14, or includes the microphone device 12 and the camera device 14. The storage device stores an utterance section detection program for causing the processor to function as the first lip shape estimation module 24, the second lip shape estimation module 26, the utterance section detection module 28, the SN ratio calculation module 32, and the motion amount calculation module 34. The storage device also stores, for example, the sound data Sd, the image data Id, and intermediate data created in order to detect an utterance section.

The utterance section detection device 10 may also be, for example, a smartphone, or a similar portable terminal, integrally including the microphone device 12 and the camera device 14, as well as a processor and a storage device that is a memory or the like. For example, an utterance section detection program for causing the portable terminal to function as the utterance section detection device 10 is installed in the storage device of the portable terminal.

Figure 2:
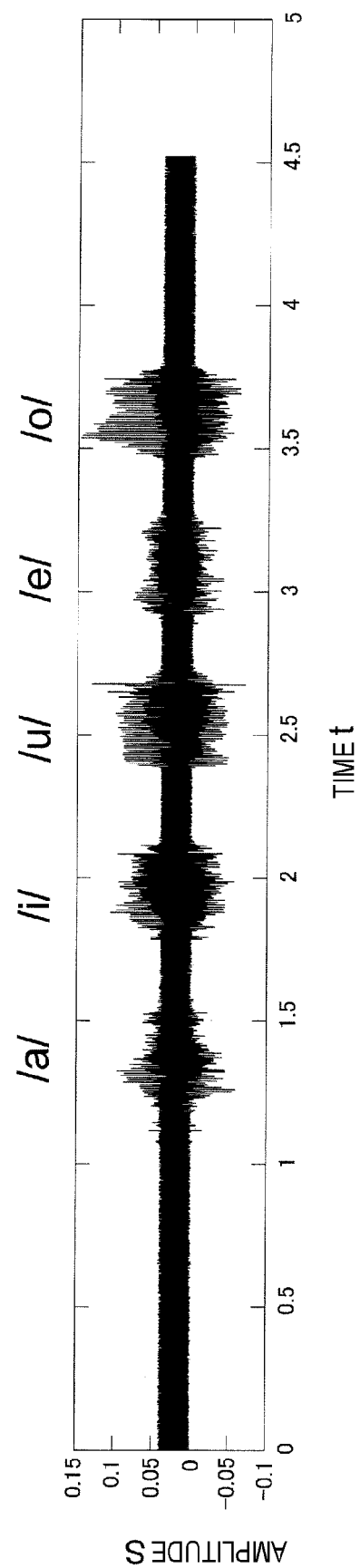
FIG. 2 is a graph for showing an example of sound data.

The microphone device 12 collects sounds in a space (for example, a conference room) in which the utterers P1 and P2 are present, and outputs the collected sounds to the utterance section detection device 10 as the sound data Sd. The microphone device 12 outputs, as shown in FIG. 2, waveform data as the sound data Sd. The sound data shown in FIG. 2 as an example includes an utterance section in which an utterer vocalizes sounds of "a", "i", "u", "e", "o" in order. Noise is superposed throughout the entire waveform data.

The camera device 14 is a device for photographing the utterers P1 and P2, and is installed so that at least faces of the utterers P1 and P2 are within a photographing range. Further, the camera device 14 creates a plurality of pieces of the image data Id including photographed images of at least the faces of the utterers P1 and P2, and outputs the created image data Id to the utterance section detection device 10.

Details of the components of the utterance section detection device 10 according to at least one embodiment and illustrated in FIG. 1 are now described.

The sound data input unit 20 of the utterance section detection device 10 receives the sound data Sd from the microphone device 12, and outputs the sound data Sd to the first lip shape estimation module 24 and the SN ratio calculation module 32.

The first lip shape estimation module 24 of the utterance section detection device 10 estimates an utterer's lip shape based on the sound data Sd. In the at least one embodiment, the degree of opening between lips is calculated as a parameter digitizing the lip shape. For that purpose, the first lip shape estimation module 24 includes a vocal tract shape analysis module 24A configured to analyze a shape of the utterer's vocal tract based on the sound data Sd, and an opening degree analysis module 24B configured to analyze the degree of opening between lips based on the analyzed vocal tract shape.

The vocal tract shape analysis module 24A uses the sound data Sd and Expression 1 given below to analyze (calculate) the vocal tract shape.

$$S(z) = \frac{1}{A(z)} U(z) \quad \text{(Expression 1)}$$

In Expression 1, S(z) is calculated by Z-transform of an amplitude S(t) at the passage of an elapsed time t since the start of sound collection.

When a linear prediction model (linear prediction coding: LPC model) is used as a vocal tract sound source model, a sampled value s(n) of a voice waveform (voice signal) is predicted from p sampled values preceding that sampled value s(n). The sampled value s(n) can be expressed by Expression 2.

$$s(n) = \alpha_1 s(n-1) + \alpha_2 s(n-2) + \ldots + \alpha_p s(n-p) \quad \text{(Expression 2)}$$

A coefficient $\alpha_i$ (i=1 to p) for p sampled values can be calculated with the use of a correlational method, a covariance method, or the like. This $\alpha_i$ may be used to express A(z) in Expression 1 by Expression 3.

$$A(z) = \Sigma \alpha_i z^{-i} \quad \text{(Expression 3)}$$

U(z) is Z-transform of a sound source signal u(t) at the same timing, and can be calculated by S(z)A(z).

A vocal tract shape 1/A(z) at the passage of the elapsed time t since the start of sound collection is calculated through the processing described above. In the at least one embodiment, a PARCOR coefficient is used for the vocal tract shape 1/A(z).

The opening degree analysis module 24B analyzes (calculates) a vocal tract sectional area with the use of the vocal tract shape 1/A(z) analyzed (calculated) by the vocal tract shape analysis module 24A, that is, the PARCOR coefficient, and Expression 4.

$$\frac{A_i}{A_{i+1}} = \frac{1-k_i}{1+k_i} (i = 1, \cdots, N) \quad \text{(Expression 4)}$$

In Expression 4, $k_i$ represents an i-th order PARCOR coefficient, and $A_i$ represents an i-th vocal tract sectional area. $A_{N+1} = 1$ is established.

Figure 3:
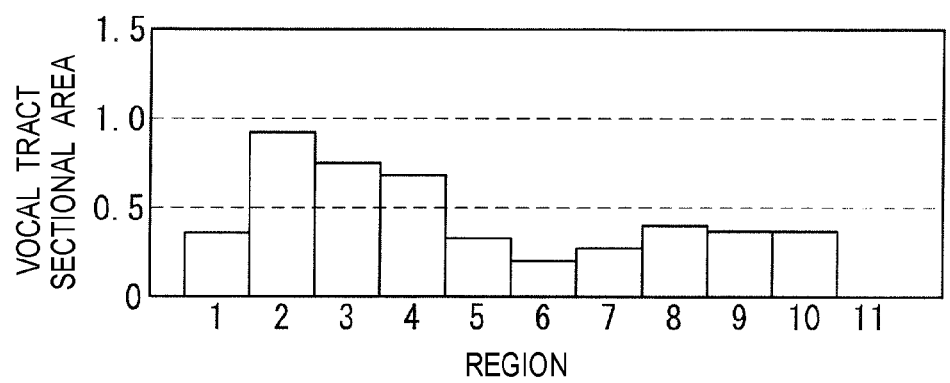
FIG. 3 is a graph for showing an example of vocal tract sectional areas in a plurality of regions of a vocal tract that is vocalizing.

FIG. 3 is a graph for showing an example of vocal tract sectional areas in a plurality of regions of a vocal tract that is vocalizing.

As shown in FIG. 3, the opening degree analysis module 24B first divides the vocal tract from a glottis to lips into eleven regions, and calculates the vocal tract sectional area $A_i$ in an i-th region counted from the lips. $A_1$ represents the vocal tract sectional area at the lips, and $A_{11}$ represents the vocal tract sectional area at the glottis.

After calculating the vocal tract sectional areas $A_1$ to $A_{11}$ in the respective regions of the vocal tract, the opening degree analysis module 24B calculates an opening degree Cs with the use of Expression 5.

$$Cs = \sum_{i=1}^{T} A_i \quad \text{(Expression 5)}$$

As indicated by Expression 5, the opening degree Cs is a sum of the vocal tract sectional area in the first region (the lips), the vocal tract sectional area in a T-th region, and the vocal tract sectional areas in regions between the first region and the T-th region. A value of from 1 to 5 is set to T, and T in the at least one embodiment is 3.

Figure 4:
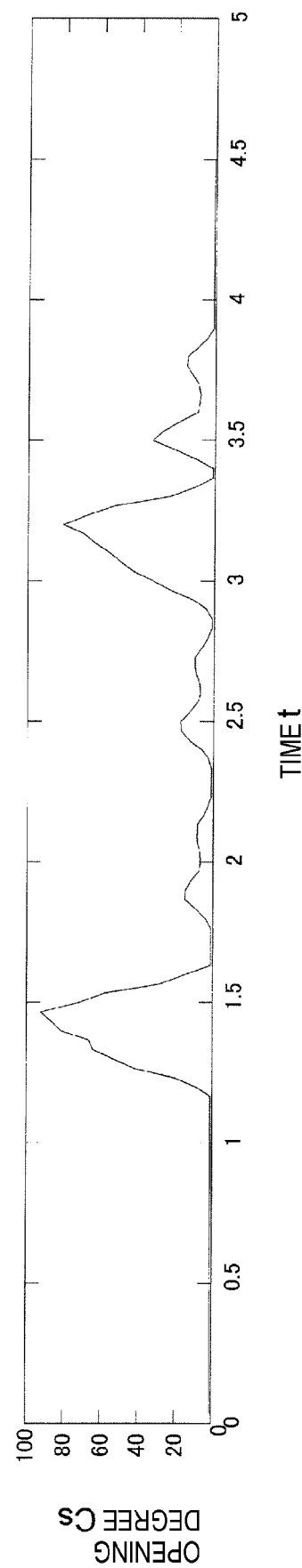
FIG. 4 is a graph for showing changes in the degree of opening between lips that is calculated based on the sound data.

FIG. 4 is a graph for showing changes in the degree of opening between lips that is calculated by the first lip shape estimation module 24, that is, the degree of opening that is calculated based on the sound data Sd. The changes in the degree of opening shown in FIG. 4 are calculated based on the sound data shown in FIG. 2.

A comparison between FIG. 2 and FIG. 4 reveals that the opening degree Cs is calculated to be large at the timing of vocalizing the sound of "a" and the timing of vocalizing the sound of "e", which are times when the mouth is opened relatively wide, whereas the opening degree Cs is calculated to be small at the timing of vocalizing the sound of "i", the timing of vocalizing the sound of "u", and the timing of vocalizing the sound of "o", which are times when the mouth is opened relatively little. The opening degree Cs is substantially zero when there is no vocalizing. It is thus understood that the opening degree Cs of the opening between lips is appropriately calculated based on the sound data Sd. However, when the sound data Sd includes voices of the plurality of utterers P1 and P2 as in the at least one embodiment, to which of the utterers the calculated opening degree Cs belongs is not identified.

Referring back to FIG. 1, (data of) the opening degree Cs calculated by the first lip shape estimation module 24 is output to the utterance section detection module 28, details of which are described later.

The image data input unit 22 of the utterance section detection device 10 receives the image data Id from the camera device 14 and outputs the image data Id to the second lip shape estimation module 26 and the motion amount calculation module 34.

The second lip shape estimation module 26 of the utterance section detection device 10 estimate the shape of the utterer's lips based on the image data Id. In the at least one embodiment, the degree of opening between lips is calculated as a parameter digitizing the lip shape. For that purpose, the second lip shape estimation module 26 includes a lip extraction module 26A configured to extract the utterer's lip region in the image data Id, and an opening degree calculation module 26B configured to calculate the degree of opening between lips based on the extracted lip region.

The lip extraction module 26A identifies and extracts a region (lip region) in which images of lips of the utterers P1 and P2 are photographed in the image data Id.

Figure 5:
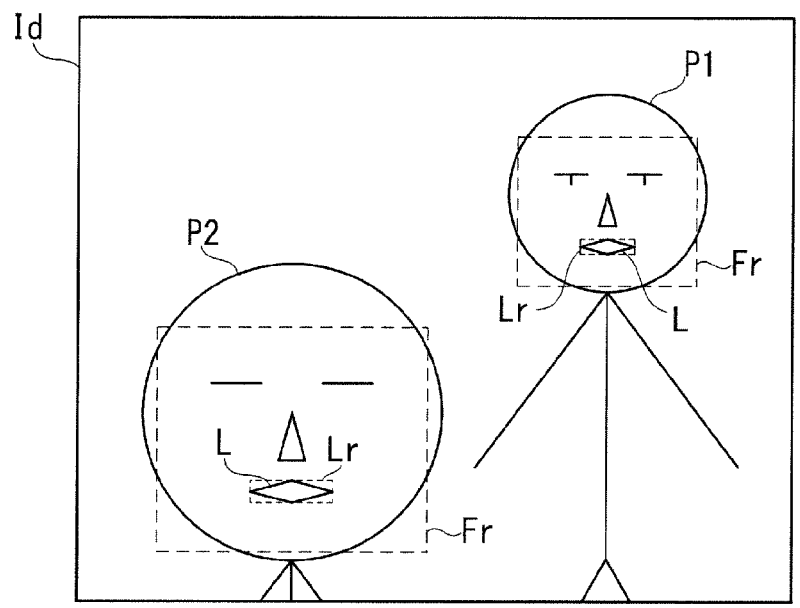
FIG. 5 is a diagram for illustrating an example of image data including photographed images of utterers' lips.

FIG. 5 is an illustration of an example of image data including photographed images of utterers' lips.

Figure 6:
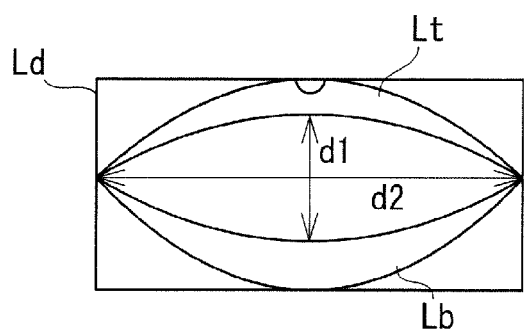
FIG. 6 is a diagram for illustrating an example of lip image data (Ld).

As illustrated in FIG. 5, the lip extraction module 26A identifies and extracts a lip region Lr in which images of lips L of the utterers P1 and P2 are photographed in the image data Id, to create lip image data Ld of a close-up image of lips as the one illustrated in FIG. 6.

Lips in the image data Id vary in size, depending on a distance between the camera device 14 and the utterer P1 and a distance between the camera device 14 and the utterer P2, and the size of the created lip image data Ld may therefore be normalized. For the normalization, the lip image data Ld may be resized based on, for example, a ratio of the size of a face region Fr, which is identified and extracted for each of the utterers P1 and P2 in the image data Id and in which an image of the utterer's face is photographed, to a standard face region size.

The opening degree calculation module 26B calculates an opening degree Ci of opening between lips, based on the lip image data Ld created by the lip extraction module 26A. In the at least one embodiment, as illustrated in FIG. 6, the opening degree Ci is a product of a distance d1 between a top lip Lt and a bottom lip Lb, and a mouth corner-to-corner distance d2 in the lip image data Ld. The opening degree Ci may simply be the distance d1 between the top lip Lt and the bottom lip Lb.

When the size of the lip image data Ld is normalized as described above, the number of pixels in a region enclosed by the top lip Lt and the bottom Lip Lb in the lip image data Ld may be calculated as the opening degree Ci.

Figure 7:
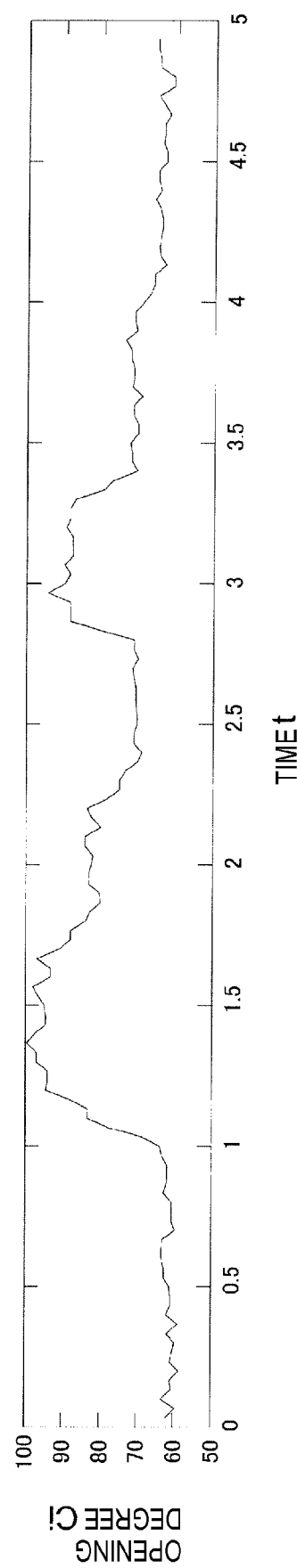
FIG. 7 is a graph for showing changes in the degree of opening between lips that is calculated based on the image data.

FIG. 7 is a graph for showing changes in the degree of opening between lips that is calculated by the second lip shape estimation module 26, that is, the degree of opening that is calculated based on the image data Id. The changes in the degree of opening shown in FIG. 7 are calculated based on image data (moving image data) of the camera device 14 which is synchronized with the sound data Sd shown in FIG. 2.

A comparison between FIG. 2 and FIG. 7 reveals that the opening degree Ci is calculated to be large at the timing of vocalizing the sound of "a" and the timing of vocalizing the sound of "e", which are times when the mouth is opened relatively wide, whereas the opening degree Ci is calculated to be small at the timing of vocalizing the sound of "i", the timing of vocalizing the sound of "u", and the timing of vocalizing the sound of "o", which are times when the mouth is opened relatively little. It is thus understood that the opening degree Ci is appropriately calculated.

Referring back to FIG. 1, (data of) the opening degree Ci calculated by the second lip shape estimation module 26 is output to the utterance section detection module 28.

When the plurality of utterers P1 and P2 are photographed by the camera device 14 as in the at least one embodiment, the opening degree Ci of opening between lips is calculated for each of the utterers P1 and P2.

The utterance section detection module 28 detects an utterance section in the sound data Sd, based on the opening degree Cs of opening between lips which is calculated by the first lip shape estimation module 24 and the opening degree Ci of opening between lips which is calculated by the second lip shape estimation module 26. For that purpose, the utterance section detection module 28 includes a correlation value calculation module 28A and a weighting coefficient correction module 28B.

In the at least one embodiment, the correlation value calculation module 28A of the utterance section detection module 28 first calculates a correlation value R indicating how much the opening degree Cs and the opening degree Ci are correlated, with the use of Expression 6.

$$R(t)=Cs(t)^\beta \times Ci(t)^\gamma \quad \text{(Expression 6)}$$

In Expression 6, Cs(t), Ci(t), and R(t) represent the opening degree Cs, the opening degree Ci, and R, respectively, at the passage of the elapsed time t since the start of sound collection. Symbols $\beta$ and $\gamma$ represent weighting coefficients (multipliers).

The utterance section detection module 28 detects a section in the sound data Sd that includes a time when the correlation value R(t) is larger than a predetermined threshold value, as an utterance section in which the utterer P1 or P2 is vocalizing with lips moving. For example, in the data shown in FIG. 2, a section from approximately 1.2 seconds to approximately 3.8 seconds when the start of sound collection is set to 0 seconds, is detected as an utterance section.

When the correlation value R(t) is larger than the predetermined threshold value, that is, when the opening degree Cs and the opening degree Ci are both larger than the threshold value, the degree of certainty that the utterer P1 or P2 who is vocalizing is moving his or her lips is high.

When the correlation value R(t) is smaller than the predetermined threshold value, that is, when at least one of the opening degree Cs and the opening degree Ci is smaller than the threshold value, on the other hand, the degree of certainty that the utterer P1 or P2 who is vocalizing is moving his or her lips is low.

For instance, when the opening degree Cs is large and the opening degree Ci is small, the microphone device 12 may be collecting a voice of a person who is outside the photographing range of the camera device 14, for example, a third person's voice traveling from outside a room in which the utterer is present, or a third person's voice from a TV or a radio.

When the opening degree Cs is small and the opening decree Ci is large, for example, the utterer P1 or P2 may be moving his or her lips without vocalizing.

The use of the correlation value R(t) accordingly enables the utterance section detection module 28 to detect an utterance section in which the utterer P1 or P2 is vocalizing in the sound data Sd at a high degree of certainty.

When the plurality of utterers P1 and P2 are photographed by the camera device 14 as illustrated in FIG. 1, an utterance section of each of the utterers P1 and P2 can be detected at a high degree of certainty by using the opening degree Ci of the utterer P1 and the opening degree Ci of the utterer P2 in the calculation of the correlation value R.

In the at least one embodiment, the utterance section detection module 28 is configured to calculate the correlation value R in consideration of reliability of each of the opening degree Cs and the opening degree Ci. This is why the utterance section detection device 10 includes the SN ratio calculation module 32 and the motion amount calculation module 34 as illustrated in FIG. 1.

The SN ratio calculation module 32 calculates the SN ratio of the sound data Sd and outputs the calculated SN ratio to the utterance section detection module 28.

The weighting coefficient correction module 28B of the utterance section detection module 28 weights the opening degree Ci heavier than the opening degree Cs in Expression 6 for calculating the correlation value R(t) given above, when the SN ratio is lower than a predetermined threshold SN ratio. That is, the opening degree Ci calculated based on the image data Id is weighted because the opening degree Cs calculated based on the sound data Sd low in SN ratio has low reliability. For example, the weighting coefficient correction module 28B executes a correction of decreasing the weighting coefficient $\beta$, which is the multiplier of the opening degree Cs in Expression 6 given above, as well as a correction of increasing the weighting coefficient $\gamma$, which is the multiplier of the opening degree Ci. This enables the utterance section detection module 28 to calculate the correlation value R(t) high in reliability.

The motion amount calculation module 34 calculates the motion amount of each of the utterers P1 and P2 based on at least a part of a photographed image of the body of the utter P1 or P2 in the image data Id. For example, the motion amount calculation module 34 calculates a shift amount of a head in the image data Id is calculated as the motion amount of each of the utterers P1 and P2. The calculated motion amount is output to the utterance section detection module 28.

When the motion amount is larger than a predetermined threshold motion amount, the weighting coefficient correction module 28B of the utterance section detection module 28 weights the opening degree Cs heavier than the opening degree Ci in Expression 6 for calculating the correlation value R(t) given above, That is, when the motion amount is large, the precision of extracting the lip region in the image data Id drops, and the opening degree Ci calculated based on that lip region has low reliability. The opening degree Cs calculated based on the sound data Sd is therefore weighted. For example, the weighting coefficient correction module 28B executes a correction of increasing the weighting coefficient β, which is the multiplier of the opening degree Cs in Expression 6 given above, and a correction of decreasing the weighting coefficient γ, which is the multiplier of the opening degree Ci. This enables the utterance section detection module 28 to calculate the correlation value R(t) high in reliability.

The utterance section detected by the utterance section detection module 28 is output to a user via the utterance section output unit 30. The utterance section output unit 30 displays the sound data Sd (waveform data) shown in FIG. 2 and displays the utterance section detected by the utterance section detection module 28, on, for example, a display device that is a display connected to the utterance section detection device 10 or the like. Further, the utterance section output unit 30 creates voice data by, for example, trimming a segment that is the utterance section detected by the utterance section detection module 28 out of the sound data Sd, and outputs the created voice data.

A flow of detecting an utterance section in the sound data is now described with reference to FIG. 8.

Figure 8:
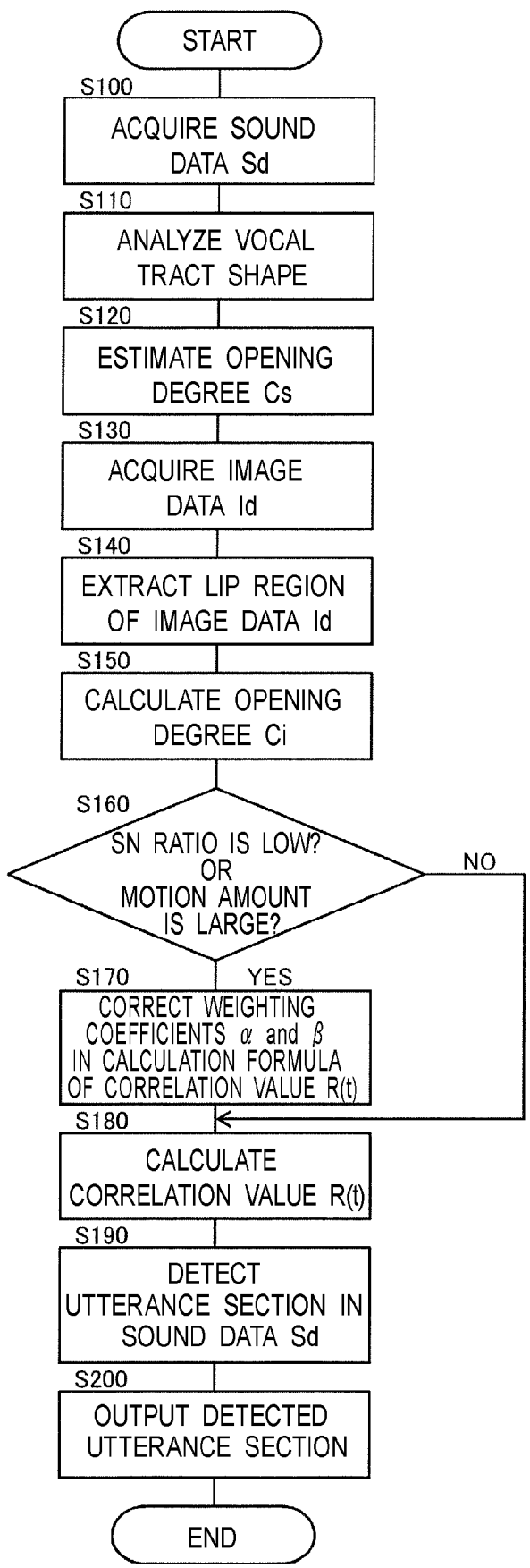
FIG. 8 is a flow chart for illustrating a flow of an example in which an utterance section is detected in the sound data.

FIG. 8 is a flow chart for illustrating a flow of an example of detecting an utterance section in the sound data.

As illustrated in FIG. 8, (the sound data input unit 20 of) the utterance section detection device 10 acquires, in Step S100, the sound data Sd including voices of the utterers P1 and P2.

In Step S110, (the vocal tract shape analysis module 24A of the first lip shape estimation module 24 of) the utterance section detection device 10 analyzes the vocal tract shape of each of the utterers P1 and P2 based on the sound data Sd acquired in Step S100.

In Step S120, (the opening degree analysis module 24B of the first lip shape estimation module 24 of) the utterance section detection device 10 analyzes the opening degree Cs of opening between lips for each of the utterers P1 and P2, based on the vocal tract shape analyzed in Step S110.

In the subsequent Step S130, (the image data input unit 22 of) the utterance section detection device 10 acquires the image data Id including photographed images of lips of the utterers P1 and P2.

In Step S140, (the lip extraction module 26A of the second lip shape estimation module 26 of) the utterance section detection device 10 identifies and extracts a lip region in the image data Id acquired in Step S130.

In Step S150, (the opening degree calculation module 26B of the second lip shape estimation 26 of) the utterance section detection device 10 calculates the opening degree Ci of opening between lips for each of the utterers P1 and P2, based on the lip region extracted in Step S140.

In Step S160, the utterance section detection device 10 determines whether the SN ratio of the sound data Sd that is calculated by the SN, ratio calculation module 32 is lower than the predetermined threshold SN ratio. The utterance section detection device 10 also determines whether the motion amount calculated for each of the utterers P1 and P2 by the motion amount calculation module 34 is larger than the predetermined threshold motion amount. When the SN ratio is lower than the threshold or when the motion amount is larger than the threshold, the process proceeds to Step S170. Otherwise, the process skips Step S170 and proceeds to Step S180.

In Step S170, (the weighting coefficient correction module 28B of the utterance section detection module 28 of) the utterance section detection device 10 corrects the weighting coefficients in the expression for calculating the correlation value R(t) (Expression 6), because of the low SN ratio or the large motion amount.

In Step S180, (the correlation value calculation module 28A of the utterance section detection module 28 of) the utterance section detection device 10 calculates the correlation value R(t).

In Step S190, (the utterance section detection module 28 of) the utterance section detection device 10 detects an utterance section in the sound data Sd based on the correlation value R(t) calculated in Step S180.

In Step S200, (the utterance section output module 30 of) the utterance section detection device 10 outputs the utterance section detected in Step S190 to the user.

The step of calculating the opening degree Ci based on the image data Id (Step S130 to Step S150) may be executed before or at the same time as the step of calculating the opening degree Cs based on the sound data Sd (Step S100 to Step S120).

According to the at least one embodiment described above, an utterance section in which an utterer is vocalizing can be detected with high precision in sound data including the utterer's voice.

To give a specific description, changes in the utterer's lip shape estimated based on the sound data (specifically, the calculated opening degree Cs) and changes in the utterer's lip shape estimated based on image data (specifically, the calculated opening degree Ci), namely, two determination materials, are used to determine an utterance section in the sound data. The utterance section can accordingly be detected at a precision higher than when only changes in the utterer's lip shape estimated based on the image data are used to detect an utterance section in the sound data.

The mode of carrying out the present disclosure is not limited to the at least one embodiment of the present disclosure described above.

For example, in the at least one embodiment described above, the correlation value R indicating correlation between the opening degree Cs, which is calculated based on the sound data Sd, and the opening degree Ci, which is calculated based on the image data Id, is calculated with the use of the calculation formula expressed by Expression 6. However, the correlation value may be calculated by other calculation formulae.

The calculation value R(t) may be, for example, a sum of the opening degree Cs(t) and the opening degree Ci(t) as indicated by Expression 7.

$$R(t)=\beta \times Cs(t)+\gamma \times Ci(i) \quad \text{(Expression 7)}$$

The correlation value R may also be a CORREL function having the opening degree Cs and the opening degree Ci as variables as indicated by Expression 8.

$$R=\text{Corr}(Cs,Ci) \quad \text{(Expression 8)}$$

When the calculation formula of Expression 8 is used, the sound data Sd is divided into a plurality of sections first. The correlation value R is calculated for each of the sections created by the division. At least one section in which the correlation value R is higher than a predetermined threshold value is detected as an utterance section.

When the opening degrees Cs and Ci have high reliability, for example, when an utter is in a quiet space, or when a lip region in image data is extracted with high precision (when image processing capability is high), at least one of the weighting coefficients β and γ may be omitted.

In the at least one embodiment described above, an utterance section in the sound data Sd is detected with the use of the correlation value R indicating how much the opening degree Cs calculated based on the sound data Sd and the opening degree Ci calculated based on the image data Id are correlated. However, the mode of carrying out the present disclosure is not limited thereto.

For instance, the utterance section may be detected based on the degree of match between a waveform of the opening degree Cs that is calculated based on the sound data Sd as shown in FIG. 4 and a waveform of the opening degree Ci that is calculated based on the image data as shown in FIG. 7.

In the at least one embodiment described above, an utterer's lip shape is estimated (specifically, the opening decree Cs is calculated) based on the sound data Sd containing noise. Sound data from which noise has been removed with a noise filter or the like may instead be used to estimate an utterer's lip shape. In this case, the lip shape can be estimated with high precision. The SN ratio calculation module 32 and the weighting coefficient correction module 30B which are illustrated in FIG. 1 can be omitted as well.

In the at least one embodiment described above, estimation of an utterer's lip shape (specifically, calculation of the opening degree Cs) is executed throughout the sound data Sd. That is, lip shape estimation is executed even for a range that is not an utterance section. Instead, a range of the sound data Sd that may include an utterance section may be inferred before the lip shape is estimated. For instance, it may be inferred that an utterance section is in a range of the sound data in which an amplitude is greater than a predetermined threshold value so that lip shape estimation is executed in the range. To give another example, it may be inferred that an utterance section is in cyclic ranges of the sound data to execute lip shape estimation in the cyclic ranges. The cyclic ranges may be, for example, ranges in which an autocorrelation function is equal to or more than a predetermined value.

In the at least one embodiment described above, voices of the plurality of utterers P1 and P2 are collected by the single microphone device 12. The microphone device 12 may therefore end up collecting voices of the plurality of utterers in an overlapping manner. This may be addressed by replacing the microphone device with a microphone array including a plurality of directional microphones that vary in directionality. Each of the directional microphones is directed to one utterer to collect sound, and the plurality of directional microphones separately acquire pieces of sound data. The lip shape is estimated for each utterer from one of the plurality of pieces of sound data.

In the at least one embodiment described above, an utterance section in the sound data Sd is detected with the use of the opening degree Cs of opening between lips which is calculated based on the sound data Sd and the opening degree Ci of opening between lips which is calculated based on the image data Id. However, the mode of carrying out the present disclosure is not limited thereto.

For example, an utterer's lip region in the image data may be extracted to calculate an amount of movement of the utterer's lips based on the extracted lip region. When an utterer vocalizes a plurality of sounds as shown in FIG. 2, the lip shape changes between one sound and the next sound. The lip shape changes also in the case of a phrase including a plurality of sounds, between the beginning of the phrase (a time when the first sound is started) and the end of the phrase (a time when the last sound ends). An utterance section may accordingly be detected by calculating, for example, based on the image data, a per-unit time amount of movement of the bottom lip relative to the top lip as a parameter digitizing the lip shape, and by using changes in the calculated movement amount and an opening degree that is calculated based on the sound data.

In another example, the amount of movement of the utterer's lips is calculated from the sound data. Referring to FIG. 2, when the utterer issues a sound, the amplitude goes through a great change between a time when the sound begins and a time when the sound ends. The amount of the amplitude change per unit time can be regarded as a per-unit time amount of movement of the lips. Accordingly, an utterance section may be detected by calculating, based on the amplitude of the sound data, a per-unit time amount of movement of the lips as a parameter digitizing the lip shape, and by using changes in the calculated movement amount and an opening degree that is calculated based on the image data.

In still another example, an utterance section in the sound data may be detected by using the amount of movement of the lips that is calculated based on the sound data as described above, and an amount of movement of the lips that is calculated based on the image data.

That is, one mode of carrying out the present disclosure is, in a broad sense, to detect an utterance section in which an utterer is vocalizing in sound data including the utterer's voice, by estimating a first lip shape of the utterer based on the sound data, estimating a second lip shape of the utterer based on image data in which an image of at least a face of the utterer is photographed, and executing utterance section detection based on changes in the first lip shape and changes in the second lip shape.

In the at least one embodiment, one opening degree is calculated from a vocal tract shape based on linear prediction analysis. The present disclosure, however, is not limited thereto, and any method of calculating the degree of opening between lips from voice information is employable. For example, the opening degree may be calculated from transmission characteristics analyzed by an ARX speech analysis method. Alternatively, the lip shape may be estimated directly from a voice by learning a relationship between a vocalized sound and a lip shape in advance through neural networking or other forms of machine learning.

The opening degree analysis module 24B may calculate an amount of change in an opening degree of an utterer from the sound data, as a motion amount that is a feature amount of the opening degree. Specifically, the motion amount can be calculated from a time difference of the opening degree. Similarly, the opening degree calculation module 26B may calculate, as a motion amount, an amount of movement of the utterer's lips from the image data. Specifically, the motion amount is calculated from a time difference of the lip shape extracted by the lip extraction module 26A. A per-unit time amount of movement of the lips is calculated, based on the amplitude of the sound data, as a motion amount that is a parameter digitizing the lip shape. Changes with time of the calculated motion amount and changes with time of a motion amount that is an amount of movement of the lips calculated based on the image data may be used by the utterance section detection module 28 in the detection of an utterance section. Specifically, the correlation calculation module 28A may calculate, for a predetermined time width, correlation between changes with time of the lip motion amount that is calculated by the opening degree analysis module 24B based on the sound data, and changes with time of the lip motion amount that is calculated by the opening degree calculation unit 26B based on the image data, to thereby calculate linkage between the changes with time.

The at least one embodiment has now been described as exemplification of the technology of the present disclosure. The accompanying drawings and the detailed description have been provided for that purpose.

Therefore, the components illustrated and described in the accompanying drawings and in the detailed description include not only ones indispensable for solving the problem but also ones that are not indispensable for solving the problem in order to exemplify the technology. These dispensable components should not be found to be indispensable just because the dispensable components are illustrated and described in the accompanying drawings and the detailed description.

The at least one embodiment described above is for exemplification of the technology of the present disclosure, and are susceptible of various changes, replacement, addition, omission, and the like within the scope of patent claims or an equivalent scope thereof.

The present disclosure is applicable to a case in which a section in which an utterer is vocalizing is required to be identified in sound data including the utterer's voice, for example, a case in which conference minutes are required to be taken.

What is claimed is:

1. An utterance section detection device, comprising:
   a memory having one or more instructions stored thereon; and
   a processor, wherein the processor executes the one or more instructions to cause the utterance section detection device to:
     acquire sound data from a microphone device, wherein the sound data is a voice of an utterer;
     estimate a first lip shape of the utterer based on the sound data;
     acquire image data from a camera device, wherein the image data is an image of at least a face of the utterer photographed by the camera device;
     estimate a second lip shape of the utterer based on the image data;
     estimate a vocal tract shape of the utterer from the sound data using a prediction model as a vocal tract sound source model that predicts a sampled value of a voice waveform of the sound data;
     calculate, based on the estimated vocal tract shape, a first opening degree indicating a first degree of opening between lips as a first parameter digitizing the estimated first lip shape;
     extract a lip region of the utterer from the image data, and calculate, based on the extracted lip region, a second opening degree indicating a second degree of opening between lips as a second parameter digitizing the second lip shape;
     calculate a correlation value indicating how much the first parameter and the second parameter are correlated;
     detect as an utterance section a section of the sound data in which the utterer is vocalizing in the sound data from changes in the estimated first lip shape and changes in the estimated second lip shape, wherein the section is one in which the calculated correlation value is larger than a predetermined threshold value; and
     create voice data by trimming a segment that is the utterance section out of the sound data; and
     output the created voice data to a display device connected to the utterance section detection device.

2. The utterance section detection device according to claim 1, wherein the image data includes a photographed image of at least a part of a body of the utterer, and wherein the processor executes one or more instructions to cause the utterance section detection device to:
   calculate a motion amount of the utterer, based on the at least part of the body of the utterer in the image data; and
   calculate the correlation value by weighting the first parameter heavier than the second parameter, when the motion amount is greater than a predetermined threshold motion amount.

3. The utterance section detection device according to claim 1, wherein the processor executes one or more instructions to cause the utterance section detection device to:
   calculate an SN ratio of the sound data;
   calculate the correlation value by weighting the second parameter heavier than the first parameter, when the SN ratio is lower than a predetermined threshold SN ratio.

4. The utterance section detection device according to claim 1, wherein the image data includes a photographed image of at least a part of a body of the utterer, and wherein the processor executes one or more instructions to cause the utterance section detection device to:
   calculate a motion amount of the utterer, based on the at least part of the body of the utterer in the image data; and
   calculate the correlation value by weighting the first parameter heavier than the second parameter, when the motion amount is greater than a predetermined threshold motion amount.

5. The utterance section detection device according to claim 1, wherein the processor executes one or more instructions to cause the utterance section detection device to:
   calculate an SN ratio of the sound data; and
   calculate the correlation value by weighting the second parameter heavier than the first parameter, when the SN ratio is lower than a predetermined threshold SN ratio.

6. The utterance section detection device according to claim 1, further comprising:
   the microphone device, wherein the microphone device acquires the sound data in a space in which the utterer is present.

7. The utterance section detection device according to claim 6, wherein the microphone device is a microphone array including a plurality of directional microphones varied in directionality.

8. An utterance section detection method of an utterance section detection device that comprises a memory storing one or more instructions thereon and a processor that executes the one or more instructions for detecting, in sound data that is a voice of an utterer, an utterance section in which the utterer is vocalizing, the utterance section detection method comprising:
   acquiring, via a microphone device, the sound data, wherein the sound data is a voice of the utterer;
   acquiring, from a camera device, image data in which an image of at least a face of the utterer is photographed by the camera device;
   estimating changes in a first lip shape of the utterer based on the sound data;
   estimating changes in a second lip shape of the utterer based on the image data; and
   estimating a vocal tract shape of the utterer from the sound data using a prediction model as a vocal tract sound source model that predicts a sampled value of a voice waveform of the sound data;

calculating, based on the estimated vocal tract shape, a first opening degree indicating a first degree of opening between lips as a first parameter digitizing the estimated first lip shape;

extracting a lip region of the utterer from the image data, and calculate, based on the extracted lip region, a second opening degree indicating a second degree of opening between lips as a second parameter digitizing the second lip shape;

calculating a correlation value indicating how much the first parameter and the second parameter are correlated;

detecting as the utterance section a section of the sound data from the estimated changes in the first lip shape and the estimated changes in the second lip shape, wherein the section is one in which the calculated correlation value is larger than a predetermined threshold value;

outputting to a display device connected to the utterance section detection device the utterance section, wherein the utterance section is displayed by the display device.

9. The method of claim 8, wherein the memory is a non-transitory computer-readable storage medium having stored thereon the one or more instructions, and wherein the one or more instructions when executed by the processor cause the processor to execute the utterance section detection method.

10. The utterance section detection method according to claim 8, wherein:
the microphone device acquires the sound data in a space in which the utterer is present; and
the camera device acquires the image data of the utterer that is in a photographing range.

11. The utterance section detection method according to claim 10, wherein the microphone device is a microphone array including a plurality of directional microphones varied in directionality.

12. An utterance section detection device, comprising:
a memory having one or more instructions stored thereon; and
a processor, wherein the processor executes the one or more instructions to cause the utterance section detection device to:
acquire sound data from a microphone device, wherein the sound data is a voice of an utterer;
estimate a first lip shape of the utterer based on the sound data;
acquire image data from a camera device, wherein the image data is an image of at least a face of the utterer photographed by the camera device;
estimate a second lip shape of the utterer based on the image data;
estimate a vocal tract shape of the utterer from the sound data using a prediction model as a vocal tract sound source model that predicts a sampled value of a voice waveform of the sound data;
calculate, based on the estimated vocal tract shape, a first opening degree indicating a first degree of opening between lips as a first parameter digitizing the estimated first lip shape;
extract a lip region of the utterer from the image data, and calculate, based on the extracted lip region, a second opening degree indicating a second degree of opening between lips as a second parameter digitizing the second lip shape;
calculate a correlation value indicating how much the first parameter and the second parameter are correlated;
detect as an utterance section a section of the sound data in which the utterer is vocalizing in the sound data from changes in the estimated first lip shape and changes in the estimated second lip shape, wherein the section is one in which the calculated correlation value is larger than a predetermined threshold value; and
output to a display device connected to the utterance section detection device the utterance section, wherein the utterance section is displayed by the display device.

13. The utterance section detection device according to claim 12, wherein the image data includes a photographed image of at least a part of a body of the utterer, and wherein the processor executes one or more instructions to cause the utterance section detection device to:
calculate a motion amount of the utterer, based on the at least part of the body of the utterer in the image data; and
calculate the correlation value by weighting the first parameter heavier than the second parameter, when the motion amount is greater than a predetermined threshold motion amount.

14. The utterance section detection device according to claim 12, wherein the processor executes one or more instructions to cause the utterance section detection device to:
calculate an SN ratio of the sound data;
calculate the correlation value by weighting the second parameter heavier than the first parameter, when the SN ratio is lower than a predetermined threshold SN ratio.

15. The utterance section detection device according to claim 12, wherein the image data includes a photographed image of at least a part of a body of the utterer, and wherein the processor executes one or more instructions to cause the utterance section detection device to:
calculate a motion amount of the utterer, based on the at least part of the body of the utterer in the image data; and
calculate the correlation value by weighting the first parameter heavier than the second parameter, when the motion amount is greater than a predetermined threshold motion amount.

16. The utterance section detection device according to claim 12, wherein the processor executes one or more instructions to cause the utterance section detection device to:
calculate an SN ratio of the sound data; and
calculate the correlation value by weighting the second parameter heavier than the first parameter, when the SN ratio is lower than a predetermined threshold SN ratio.

17. The utterance section detection device according to claim 12, further comprising:
the microphone device, wherein the microphone device acquires the sound data in a space in which the utterer is present.

18. The utterance section detection device according to claim 17, wherein the microphone device is a microphone array including a plurality of directional microphones varied in directionality.

* * * * *